US011932528B2

(12) United States Patent
Bergamini et al.

(10) Patent No.: US 11,932,528 B2
(45) Date of Patent: Mar. 19, 2024

(54) ASSEMBLY, APPARATUS AND METHOD FOR DISPENSING FLUID PRODUCTS

(71) Applicants: COROB S.P.A, San Felice sul Panaro (IT); PPG INDUSTRIES OHIO, INC., Cleveland, OH (US)

(72) Inventors: Andrea Bergamini, Nonantola (IT); Giuseppe Casalini, Canegrate (IT); Joanne Sarah Thompson, Acton (GB); Alban R. D'Epenoux, Morges (CH)

(73) Assignees: Corob S.p.A. (IT); PPG Industries Ohio, Inc., Cleveland, OH (US)

( * ) Notice: Subject to any disclaimer, the term of this patent is extended or adjusted under 35 U.S.C. 154(b) by 275 days.

(21) Appl. No.: 17/549,826

(22) Filed: Dec. 13, 2021

(65) Prior Publication Data

US 2022/0127132 A1    Apr. 28, 2022

Related U.S. Application Data

(63) Continuation of application No. PCT/IT2020/050145, filed on Jun. 9, 2020.

(30) Foreign Application Priority Data

Jun. 11, 2019  (IT) .................. 102019000008571

(51) Int. Cl.
*B67D 7/62* (2010.01)
*B67D 7/02* (2010.01)
(Continued)

(52) U.S. Cl.
CPC ............ *B67D 7/62* (2013.01); *B67D 7/0277* (2013.01); *B67D 7/0294* (2013.01);
(Continued)

(58) Field of Classification Search
CPC ...... B67D 7/62; B67D 7/0277; B67D 7/0294; B67D 7/84; G06K 7/10366; G06K 7/1413;
(Continued)

(56) References Cited

U.S. PATENT DOCUMENTS 3,122,272 A    2/1964 Marsh
4,258,759 A *  3/1981 Achen ................. B44D 3/003
                                              141/129

(Continued)

FOREIGN PATENT DOCUMENTS

EP       1 492 970         1/2005
WO    WO 03/083334 A1     9/2003

OTHER PUBLICATIONS

International Search Report and Written Opinion in Parent Application, PCT/IT2020/050145, dated Feb. 10, 2020 (10 pages).

*Primary Examiner* — Vishal Pancholi
(74) *Attorney, Agent, or Firm* — Calderone McKay LLC

(57) ABSTRACT

An assembly for dispensing fluid products, comprising a housing (44) having a dispense opening (40) and a mount (42) for a container (12) that contains the fluid product, pumping means (45), a diverting element (53) rotatable around a rotation axis (R) provided with a first channel (A) and a second channel (B), which are in fluid communication with one another and each have an open end (66) arranged radially with respect to the rotation axis (R) on a peripheral surface (65) of the rotatable diverting element (53). The assembly further comprises a suction conduit (49) connected to an inlet of the pumping means (45) for withdrawing fluid product from said container (12) installed on the mount (42), a delivery conduit (50) fluidly connecting an outlet of the pumping means (45) and said rotatable diverting element (53), and a recirculation conduit (52) arranged downstream of the diverting element (53) for returning fluid product to (Continued)

the container (12). The rotatable diverting element (53) has at least one recirculation position (O) in which the open end (66) of one of the channels faces the open and of the delivery conduit (50) to be in fluid communication with the latter and the open end (66) of the other channel faces the recirculation conduit (52) to be in fluid communication with the latter so as to recirculate the fluid product to the container (12); and at least a delivery position (I), in which the open end (66) of one of the channels faces an open end of the delivery conduit (50), to be in fluid communication with the latter, and the open end (66) of the other channel faces the dispense opening (40) for dispensing the fluid product.

24 Claims, 10 Drawing Sheets

(51) Int. Cl.
- *G06K 7/10* (2006.01)
- *G06K 7/14* (2006.01)
- *B67D 7/84* (2010.01)

(52) U.S. Cl.
CPC ....... *G06K 7/10366* (2013.01); *G06K 7/1413* (2013.01); *G06K 7/1417* (2013.01); *B67D 7/84* (2013.01)

(58) Field of Classification Search
CPC ....... G06K 7/1417; F04B 49/22; F04B 49/24; F04B 53/10; F04B 23/02
See application file for complete search history.

(56) References Cited

U.S. PATENT DOCUMENTS

| | | | |
|---|---|---|---|
| 5,078,302 A | | 1/1992 | Hellenberg |
| 9,821,334 B2 | | 11/2017 | Gnutti et al. |
| 2005/0092386 A1 | * | 5/2005 | Kaufhold ........ B01F 35/718051 141/83 |
| 2011/0115223 A1 | * | 5/2011 | Stahlkopf ................ H02P 9/04 290/7 |
| 2011/0290823 A1 | * | 12/2011 | Miller .................... B05B 15/58 239/113 |
| 2013/0032244 A1 | | 2/2013 | Boboltz |
| 2017/0252766 A1 | | 9/2017 | Post et al. |

\* cited by examiner

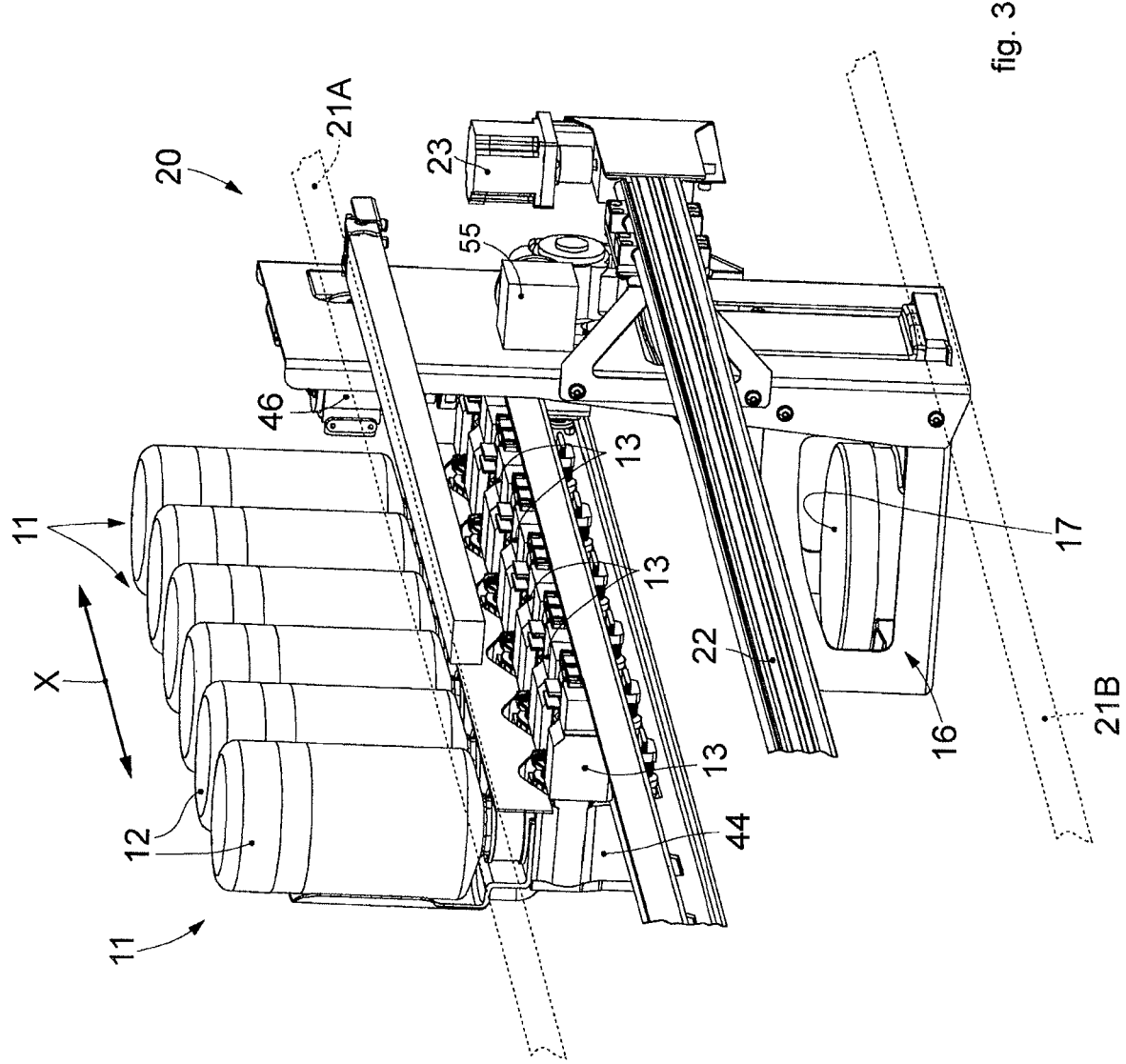

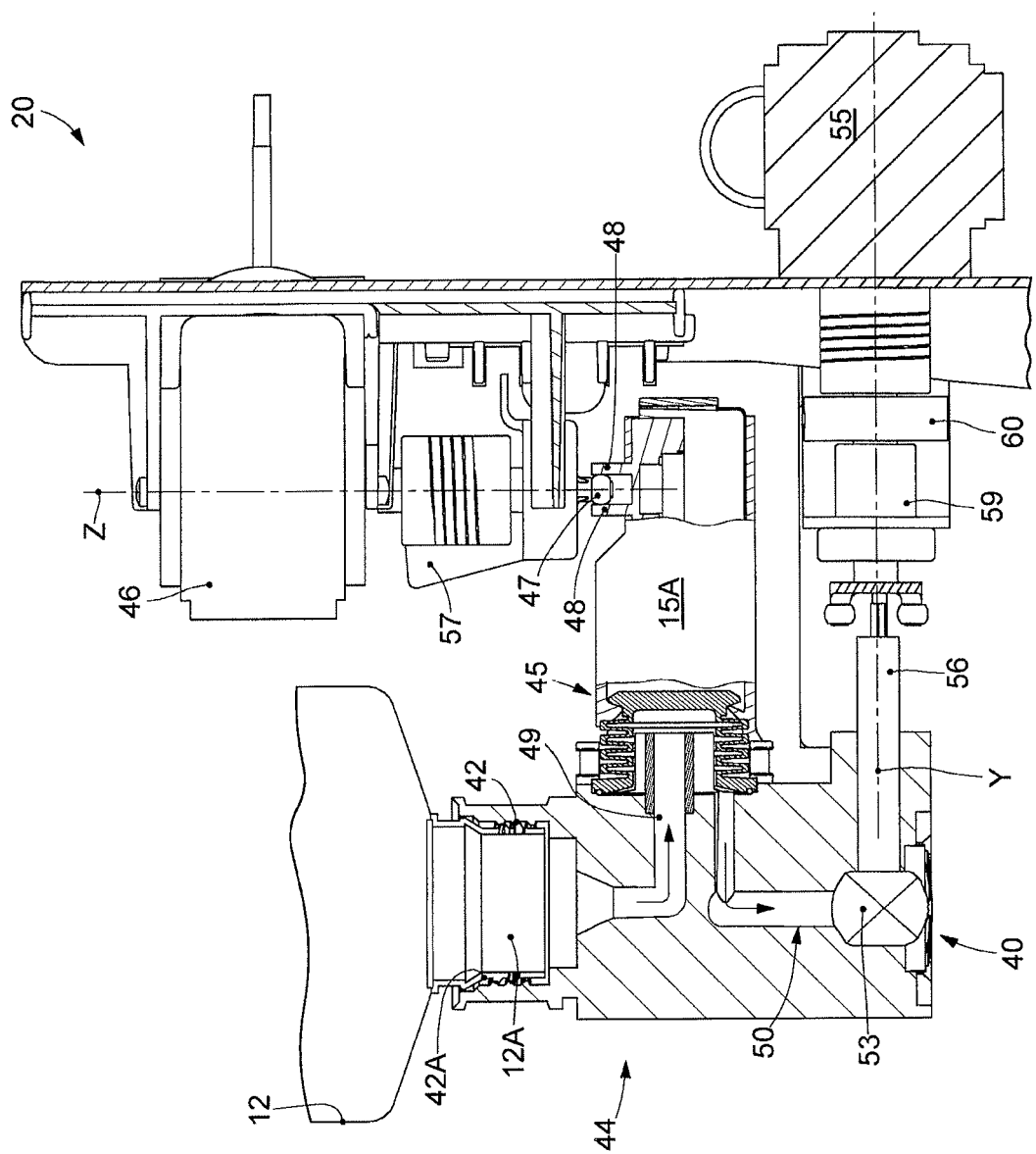

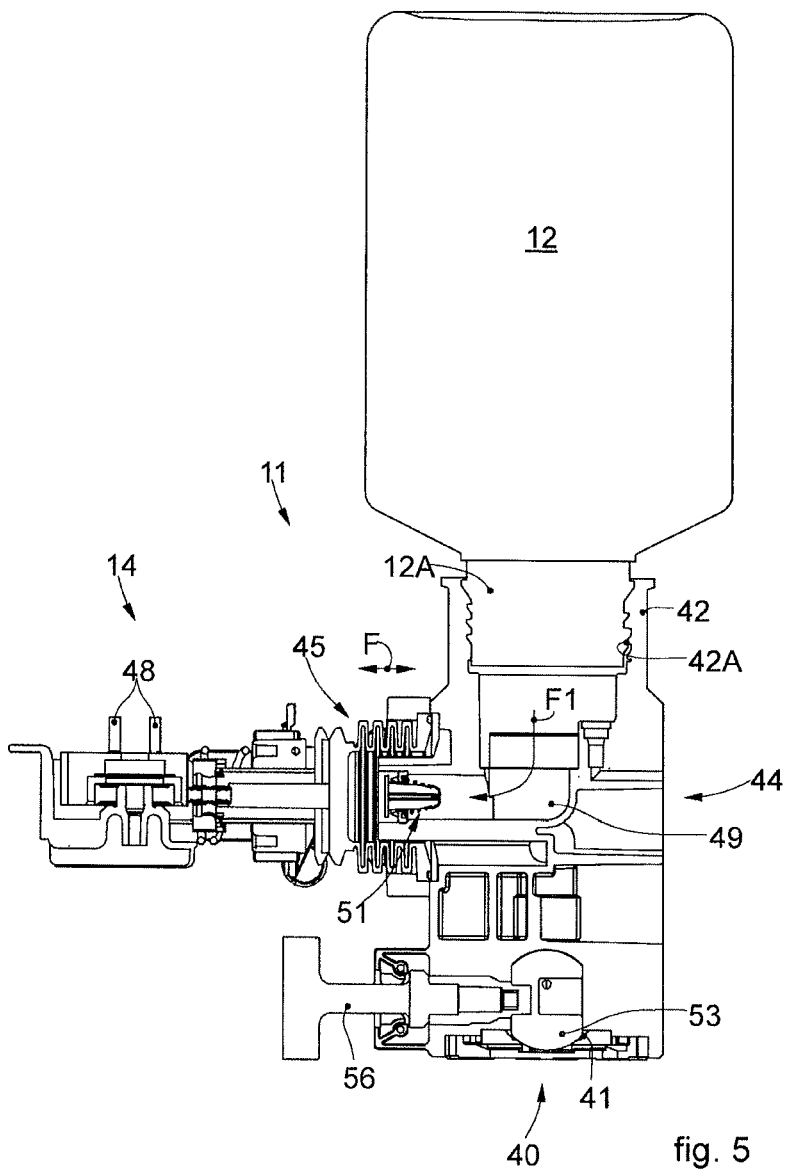
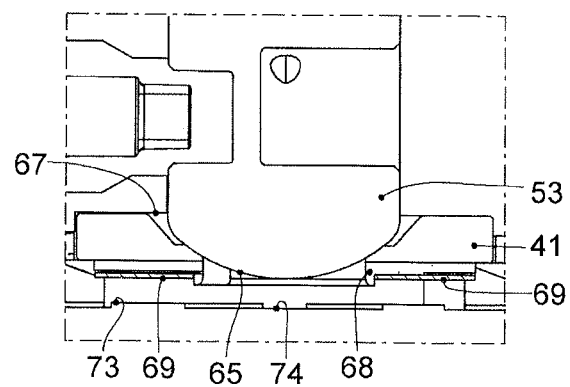

ASSEMBLY, APPARATUS AND METHOD FOR DISPENSING FLUID PRODUCTS

CROSS-REFERENCE TO RELATED APPLICATIONS

This application is a continuation application of and claims priority under 35 U.S.C. § 120 and priority under 35 U.S.C. §§ 363, 365 to International Patent Application No. PCT/IT2020/050145, filed Jun. 9, 2020, which was published in the English language, and which claims priority under 35 U.S.C. § 119 to Italian Application No. 102019000008571, filed Jun. 11, 2019. The entire disclosures of these applications are incorporated herein by reference.

BACKGROUND OF THE INVENTION

Field of the Invention

The present invention concerns an assembly and a method for dispensing fluid products, in particular coloring fluid products as for example paints, pigments, coating compositions or the like, as well as a dispensing machine comprising one or more of such assemblies and its use for preparing user-defined formulations, such as paint formulations, for example in the field of refinishing or repair applications.

Description of Related Art

Assemblies for dispensing fluid products are very well known in the art, usually in association with automatic dispensing machines for dispensing fluid products. Such machines can comprise a plurality of assemblies for dispensing a fluid product, each one configured to deliver a paint having different variations of color, shade or brightness.

In the dispensing machines known in the art, a delivery station is provided. In the delivery station a receptacle is placed into which one or more products are delivered that are withdrawn by respective assemblies, possibly according to a predetermined delivery sequence to provide the formulation requested by the operator.

The assemblies known in the art typically comprise a pump, for example a volumetric pump, and a valve arrangement comprising one or more valve elements suitably disposed along the conduits along which the fluid product passes through to selectively permit or prevent the passage of the fluid product under certain circumstances.

The fluid product in the container tends though to age or degrade over time upon storage, e.g. by drying, sedimentation, phase separation and/or formation of agglomerated material. The product quality may thus deteriorate and there is a risk of a clogging of the assembly or parts thereof.

Assemblies have been developed to address this issue. Examples of such assemblies known in the art are disclosed in the U.S. patent application no. US-A1-2017/0252766 and in the European patent no. EP-B1-1.492.970. In these assemblies a rotatable valve member provided with at least three radial channels having a diameter different from one another is arranged between a container of fluid product and a piston pump. An associated controller can operate the pump and valve to withdraw liquid from the container and then either dispense it via a channel of the valve of selected size brought to a dispense position or purge the liquid from the pump back to the container for cleaning channels of the valve in a purging position. These prior art solutions may counteract clogging of the dispense opening, but they do not provide for an efficient homogenization of the liquid product in the container to maintain a high quality of withdrawn product even after long periods of storage.

Another assembly is known from the international patent application no. WO-A1-2018/041051. This document discloses an assembly comprising a valve element that is movable along a longitudinal direction of the housing. According to the position of the valve element, different conduits are put in fluid communication to one another so as to alternatively obtain the delivery condition or the recirculation condition said above.

Moreover, the valve elements and/or the conduits arrangement of all the above cited prior art documents are designed to obtain a main delivery—at a higher flow rate—and a precision delivery, for reaching with accuracy the set quantity of fluid to be delivered.

Accordingly, one disadvantage of the afore-mentioned assemblies known in the art is that they are rather complex to be manufactured and mounted in the dispensing machine. This significantly increases the cost and the time required either for its manufacturing and maintenance.

Another disadvantage of the assemblies known in the art is that the reciprocal arrangement of the pump, of the conduits in the housing and of the can containing the fluid product, makes longer the paths along which the fluid product travels. This increases the delivery time that is required for the fluid product to exit the assembly for its delivery.

Another disadvantage of the afore-mentioned assemblies known in the art is that they are bulky. This means that the dispensing machines to which they are associated need a bigger internal volume for accommodating the assemblies and thus are in turn bulky too.

There is therefore a need for an assembly for dispensing fluid products, and a corresponding dispensing method, which alleviate or overcome at least one of the aforementioned disadvantages of the state of the art.

The Applicant has devised, tested and embodied the present invention to overcome the shortcomings of the state of the art and to obtain these and other purposes and advantages.

BRIEF SUMMARY OF THE INVENTION

In accordance with the above purposes, according to the invention an assembly for dispensing fluid products is provided. The assembly comprises a housing having a dispense opening and comprising a mount for a container that contains the fluid product. The assembly further comprises pumping means, a conduit system including a suction conduit, a delivery conduit and a recirculation conduit as well as a valve arrangement. The valve arrangement comprises a diverting element rotatable around a rotation axis provided with a first channel and a second channel, which are in fluid communication with one another and each have an open end arranged radially with respect to the rotation axis on a peripheral surface of the rotatable diverting element. The rotatable diverting element has at least one recirculation position the fluid product delivered via the suction and delivery conduit is recirculated via the recirculation conduit to the container, and at least one delivery position, in which the fluid product delivered via the suction and delivery conduit is dispensed via the dispense opening.

The present invention also relates to a dispensing machine for dispensing fluid products comprising at least one such assembly.

The present invention is also directed towards a method for dispensing fluid products, comprising:
- (a) providing a housing having a dispense opening and comprising a mount for a container that contains the fluid product, and pumping means;
- (b) providing a valve arrangement comprising a diverting element rotatable around a rotation axis provided with a first channel and a second channel, which are in fluid communication with one another and each have an open end arranged radially with respect to the rotation axis on a peripheral surface of the rotatable diverting element;
- (c) actuating said pumping means to extract the fluid product from the container through a suction conduit and to deliver the fluid product to a delivery conduit;
- (d) driving the rotatable diverting element to alternatively bring the latter (i) in a recirculation position, in which the fluid product delivered via the suction and delivery conduit is recirculated via the recirculation conduit to the container, or (ii) in a delivery position, in which the fluid product delivered via the suction and delivery conduit is dispensed via the dispense opening.

The method according to the present invention can in particular be carried out using an assembly for dispensing fluid products of the present invention or a dispensing machine comprising the same as described herein.

The assembly for dispensing fluid products according to the present invention has a compact and flexible design enabling use in confined spatial environments, so as to occupy a relatively small volume in a dispensing machine containing the same. It is thus a characteristic advantage of the present invention that the arrangement of the conduits and of the rotatable diverting element in the housing allow to have a more compact housing, and therefore an assembly that is much less bulky compared to the assemblies known from the art enabling use in confined spatial environments, such as in dispensing machines having rather compact dimensions.

The configuration of the present invention enables moreover easy access of the operator to the assembly and avoids laborious maintenance operations. The assembly and the method according to the present invention allow to obtain the delivery of a required amount of fluid products in a reliable, safe and economic manner with high accuracy and speed. It allows efficiently mitigating or preventing ageing, drying or degradation of the liquid products upon storage and allows to efficiently homogenize the product and clean the conduits for use. The present invention thus enables to deliver fluid products of high quality even from containers that have not been used for a long time, with no or limited ageing such as drying or solidification of the liquid products upon storage in the containers. Moreover, the simple configuration of the rotatable diverting element makes the assembly, and therefore the dispensing machine to which it is associated, easy to be controlled.

The fluid products used in accordance with the present invention can in particular comprise or be coloring fluid products. The present invention is accordingly particularly useful for preparing color formulations. It can for example be used to provide user-defined paint formulations or coating compositions, particularly for refinishing or repair purposes, for example in a body shop for painting a vehicle body.

These and other optional aspects, characteristics and advantages of the present disclosure will be better understood with reference to the following description, drawings and attached claims. The drawings, which are integrated and form part of the present description, show some non-limiting forms of embodiment of the present invention, and together with the description, are intended to describe the principles of the disclosure.

BRIEF DESCRIPTION OF THE SEVERAL VIEWS OF THE DRAWINGS

In the drawings:

FIG. 3 is a partial and schematic perspective view, from the rear, of a portion of a dispensing machine shown in FIG. 11 in which another embodiment of some assemblies according to the invention, received in respective seatings, is visible;

FIG. 4 is a partial and schematic section view of one of the assemblies visible in FIG. 3, in which a portion of the container associated to the assembly and a portion of the dispensing machine are also illustrated;

FIG. 5 is a section view of the assembly and of the container associated thereto that are visible in FIG. 1, taken along a first longitudinal section plane;

FIG. 5A is an enlarged detail view of a portion of the section view of FIG. 5;

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF THE INVENTION

Figure 1:
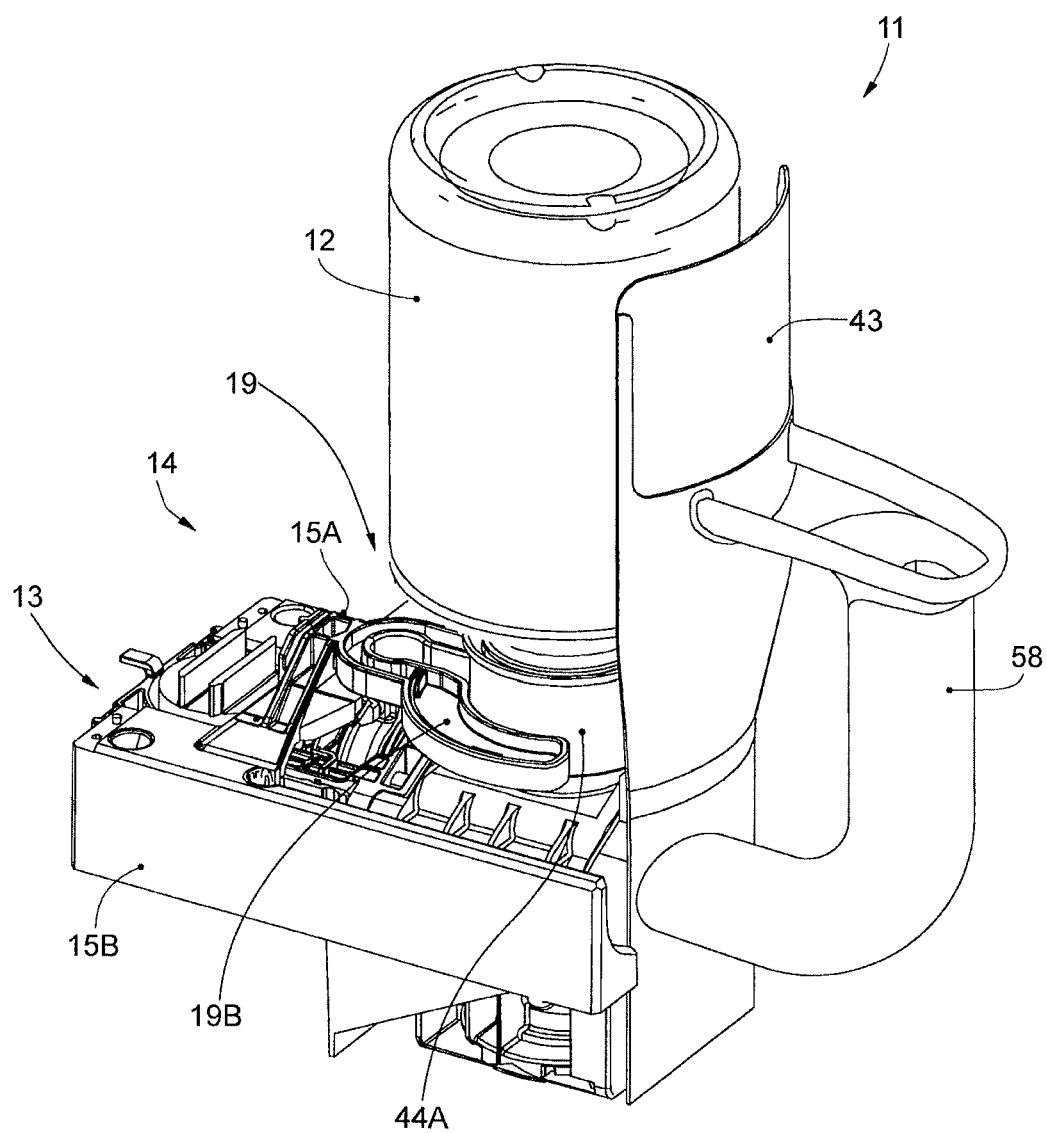
FIG. 1 is a perspective view of an embodiment of an assembly for dispensing fluid products according to the present invention, in which the assembly is mounted on a seating of a dispensing machine and a container is associated to the assembly.

As set forth above, the present invention relates to an assembly comprising a housing having a dispense opening through which the fluid product is delivered, for example into an underneath receptacle. The dispensing opening can be suitably designed and dimensioned according to the maximum flow rate that the assembly can deliver. The housing comprises a mount for a container that contains the fluid product. The shape and dimensions of the container are not particularly limited, but should allow for a reasonable handling by an operator and sufficient contained fluid product for common formulation purposes. Typically, the container contains a volume of fluid product in the range from 0.1 liters up to 5 liters, preferably 0.5 to 2 liters. According to the invention, the container can be detachably fitted in the mount so as to be replaced or refilled once the fluid product contained therein is consumed. For example, the mount can be internally threaded to be engaged by the neck of a container, which is in turn externally threaded so as to couple with the mount. The assembly according to the invention further comprises pumping means, in particular volumetric pumping means such as a bellows pump or piston pump, or gear pump. It moreover comprises a valve arrangement comprising a diverting element rotatable around a rotation axis and provided with a first channel and a second channel which are in fluid communication with one another and each have an open end terminating on a peripheral surface of the rotatable diverting element. In the present description, with the expression "fluid communication" it is intended to mean that the recited elements, in this case the first and second channels, are connected to each other in such a way as to let the fluid pass from one element (channel) to the other. According to the present invention the diverting element may act as a three-way two-position valve, in which the valve may assume at least two different configurations according to which an inlet passage through which the fluid enters the valve alternatively communicates with one or the other outlet passages for the fluid. The first channel and the second channel may have a symmetric configuration one to the other with respect to the rotation axis. The first channel and the second channel may be in fluid communication through a central hole and extend parallel to one another, departing in a tangential manner from the central hole. The channels may have substantially the same or different dimensions (e.g. in cross-section). For example, the first channel and the second channel may have substantially the same cross-section. The open ends of the above channels may be on the peripheral surface of the diverting element in respective positions such as to be arranged opposite one another by approximately 180°, such as 180°±5° or 180°±2°. The pumping means and the diverting element may be independently driven by respective motors. The motors of the pump and of the diverting element can be comprised by the assembly or be external elements that may be operatively connected to the pump and the diverting element, respectively. For example, the motors may be mounted on a movable slider that is comprised by a dispensing machine to which the assembly of the invention is associated. In this way, the slider can be brought, time-by-time, in a position in which it is in operative connection to the assembly containing the fluid product to be delivered so that the motors mounted on it can suitably operate the pumping means and the diverting element. This is advantageous since the dispensing machine then needs only one motor for the pumping means and one motor for the diverting element, even if several assemblies can be accommodated at the same time in the machine. By way of example, a dispensing machine can accommodate a plurality of assemblies according to the invention, such as up to thirteen, each of them possibly having a container filled with a different fluid product. Driving elements may be provided, connected to a respective motor and mounted on the slider too, which are configured to selectively engage coupling means of the assembly to drive the pumping means or the diverting element, respectively.

The assembly according to the present invention may optionally comprise a strip off element, which is proximate to or in contact with the peripheral surface of the rotatable diverting element for cleaning this surface. Preferably the strip off element may be formed by a wall of the housing defining the dispense opening.

As mentioned above, the assembly according to the invention comprises furthermore a suction conduit. The suction conduit is connected to an inlet of the pumping means for withdrawing fluid product from said container installed on the mount. The assembly further comprises a delivery conduit. The deliver conduit fluidly connects an outlet of the pumping means and the rotatable diverting element. Moreover, the assembly comprises a recirculation conduit. The recirculation conduit fluidly connects the diverting element to the container for returning fluid product to the container. The recirculation conduit is typically arranged downstream of the diverting element. Herein "downstream" refers to a subordinate arrangement with respect to the designated reference element (such as the diverting element as above) along the fluid path in the flow direction imposed by the pump withdrawing fluid product from the container via the suction conduit. The valve arrangement comprises the rotatable diverting element as set forth above and may further comprise one or more check valve(s). For example, it may comprise a check valve disposed along the suction conduit and/or a check valve along the delivery conduit.

As set forth above, the rotatable diverting element has at least one recirculation position and at least one delivery position. In the recirculation position(s) the open end of one of the channels faces an open end of the delivery conduit, to be in fluid communication with the delivery conduit, and the open end of the other channel faces an open end of the recirculation conduit to be in fluid communication with the recirculation conduit so as to recirculate the fluid product to the container. In the delivery position(s) the open end of one of the channels faces an open end of the delivery conduit, to be in fluid communication with the delivery conduit, and the open end of the other channel faces the dispense opening for dispensing fluid product. Preferably, the rotatable diverting element may for example have two recirculation positions and two delivery positions per each complete rotation of the diverting element around the rotation axis. Herein, the diverting element may in particular be configured such that rotation by the same angle, for example of about 90°, allows changing between adjacent ones of said positions. For example, in one of the recirculation positions the first channel communicates with the delivery conduit and the second channel communicates with the recirculation conduit, whilst in the other recirculation position, vice versa, the second channel communicates with the delivery conduit and the first channel communicates with the recirculation conduit. Similarly, in one of the delivery positions the first channel communicates with the delivery conduit and the second channel communicates with the dispense opening, whilst in the other delivery position the second channel communicates with the delivery conduit and the first channel communicates with the dispense opening.

The assembly according to the present invention may optionally comprise a fluid-conditioning device associated to the rotatable diverting element that is configured to controllably handle residual amount of fluid product contained in the channels of the rotatable diverting element upon rotation of the rotatable diverting element, e.g. when changing from a delivery position to a recirculation position or vice versa.

In an exemplary version, the fluid-conditioning device performs a linear (translational) movement made of a backward and forward stroke whilst the diverting element is rotating around the rotation axis, e.g. from a delivery position to a recirculation position or vice versa. In a preferred version, during the backward stroke the fluid-conditioning device sucks drips of fluid product that are present in the first and second channels at the end of the preceding dispensing phase or recirculation phase, as the case may be, whilst during the forward stroke the fluid-conditioning device delivers such drips of fluid product alternatively towards the recirculation conduit and/or the delivery conduit, in particular towards the one or the other of these conduits that is fluidly connected with said channels. In a preferred variant, the diverting element rotates at each cycle by approximately 90°. The fluid-conditioning device may be connected to the rotatable diverting element by means of a mechanical connection so that the motion of the fluid-conditioning device is driven by the rotation of the rotatable diverting element, and a guide system is provided that prevents the rotation of the fluid-conditioning device by forcing the latter to move according to a linear translational motion so as to perform the aforesaid linear (translational) motion. In a preferred embodiment, the mechanical connection allows sliding of the fluid-conditioning device parallel to the rotation axis of the rotatable diverting element.

According to the present invention, the assembly may further comprise a coupling portion intended to allow for removably mounting the assembly to support means of a dispensing machine. The support means are able to firmly maintain in place the assembly of the invention in a stationary manner, i.e. so that the assembly substantially does not move during operation of the dispensing machine. For example, the support means can comprise a plurality of fixtures each shaped so as to receive and retain a coupling portion of said assembly. Different types of couplings allowing a reversible mounting as known from the art can be used such as for example, without being limited thereto, threaded couplings, snap-fit couplings or alike. The assemblies can be held by fixtures in a specific orientation such as for example with the bottom of a container mounted to the assembly facing upwards or any other desired orientation. The coupling portion of the assemblies can be specific to a manufacturer of the fluid products. The assemblies are removable from the support means thus allowing to mount containing units of a variety of different fluid products in accordance with the needs to prepare a specific targeted formulation and to allow for a replacement of an assembly once the content of a container mounted thereto has been consumed.

According to the present invention, the assembly typically further comprises an identity code that is univocally associated to the assembly and that is configured to be read by detection means, such as an optical bar code reader, which may be mounted on the aforesaid movable slider carrying also the motors that operate the pumping means and the diverting element. Preferably, the identity code can be a bi-dimensional or a tri-dimensional bar code, and the detection means is configured as a bar code reader known in the art. Alternatively, the detection means can comprise suitable means that are able to recognize the identity code that is univocally associated with each containing unit, based on RFID or NFC technology, which are known as such in the art. The detection means can be operatively linked to a controller, such as the main controller commanding the operation of the dispensing machine, enabling the machine to detect which fluid product is contained in which assembly and use that information in the sequential preparation of the targeted formulation. The controller can be operationally linked also to said motors actuating the pumping means and the rotatable diverting element, to the actuator driving the sliding of the slider, and also to metering means of the machine, if present, able to meter the quantity of fluid products delivered by the assemblies. The controller can comprise one or more processors known in the art, which can be programmed to perform the above functions. The controller can be part of, or connected to, a computer system that enables a user to control operation of the dispensing machine comprising the assemblies according to the invention and to define the formulation to be produced thereby.

The assembly according to the present invention may further comprise an ergonomic handle projecting from the housing from a front side opposite said pumping means and intended to be grasped by the operator handling the assembly.

As set forth above, the present invention thus also relates to a dispensing machine for dispensing fluid products. The dispensing machine can be of any type as known in the art as long as it comprises at least one assembly according to the present invention. An example of a suitable dispensing machine, which can be used with the assemblies of the present invention is for instance disclosed in the Italian patent application no. IT 2018000006154, filed by the same Applicants. For instance, the dispensing machine may comprise a plurality of assemblies of the present invention mounted along linear support means. As set forth above, it may moreover comprise a movable slider with at least one motor mounted thereon for driving the pumping means and/or the rotatable diverting element to control the dispense and/or recirculation of the respective fluid products when moved to a position in which it is in operative connection to an assembly, e.g. along a rail that extends parallel to the linear support means. As mentioned above, the dispensing machine may moreover optionally comprise detection means, such as an optical bar code reader, for reading an identity code provided on the at least one assembly. The detection means may preferably be mounted on the movable slider.

With reference to the drawings, it will now be described an exemplary assembly for dispensing fluid products in accordance with the present invention, indicated in its entirety by the reference number 11. The assembly and components thereof depicted in the appended Figures are intended for illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

The assembly 11 allows delivering a certain quantity of fluid products withdrawn from a container 12 that is detachably associable to the assembly 11 via a mount 42.

The container 12 can have, by way of example, a volume in a range from 100 mL up to 5 liters, such as 0.5 liters, 1 liter, or 2 liters of coloring fluid products.

The assembly 11 according to the invention comprises a coupling portion 14 through which the assembly can be fixed to supporting means of a dispensing machine, as visible for example in FIG. 3, where a portion of such a machine is depicted.

Figure 2:
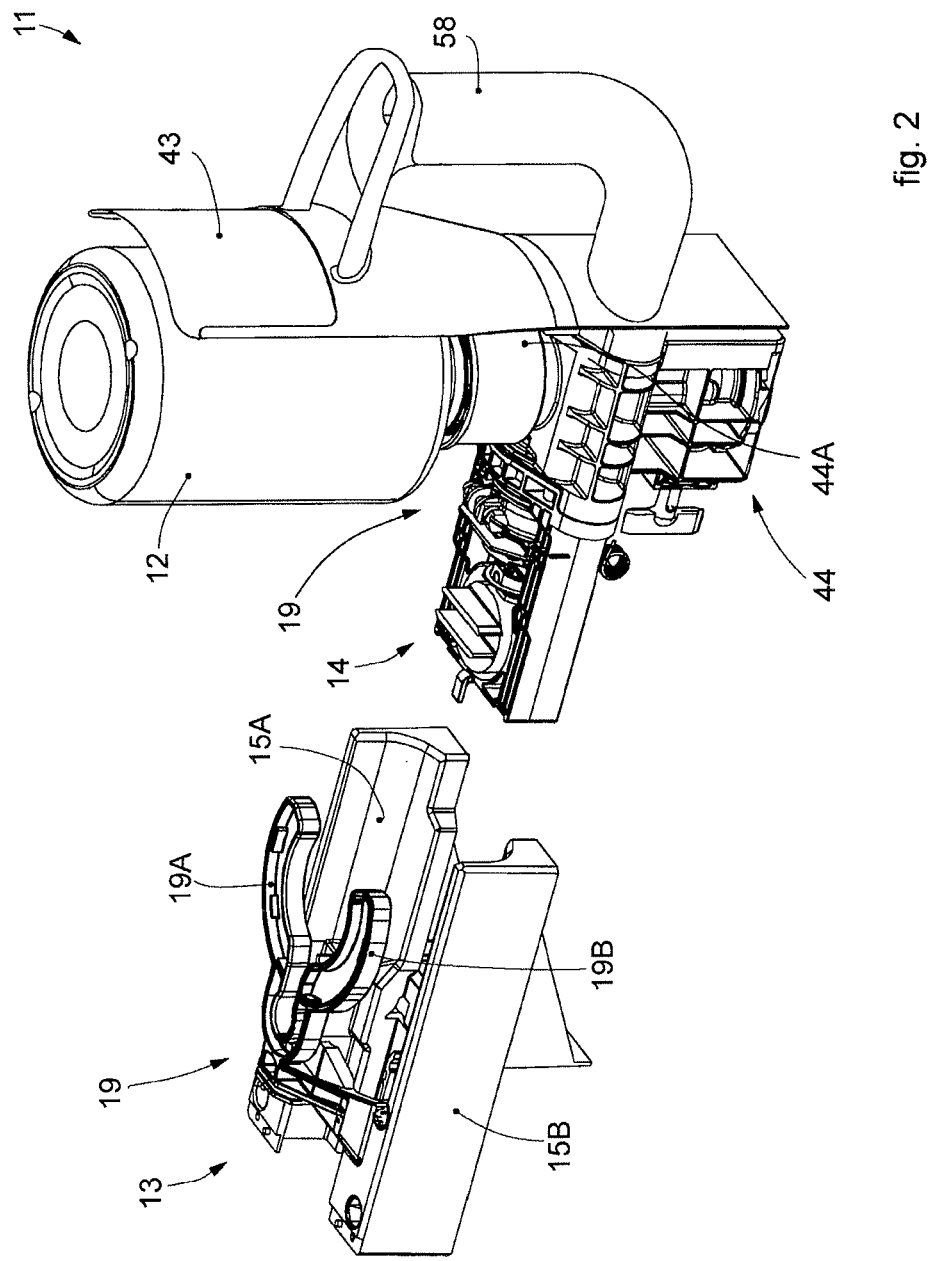
FIG. 2 is an exploded perspective view of FIG. 1, in which the assembly and the seating are clearly visible.

The supporting means may comprise one or more fixtures 13, better visible in FIGS. 1 and 2, wherein each fixture 13 is intended to receive and retain the coupling portion 14 of a respective assembly 11.

The fixture 13 may comprise a pair of supporting elements 15A, 15B that act as lateral guides during the insertion and the removal of the assembly in/from the fixture 13, at the same time supporting the latter from below and from the sides. To do this, the supporting elements 15A, 15B are shaped to surround the sides and, at least partially, the bottom of the fixture 13.

The fixture 13 may further comprise an auxiliary supporting member 18 that is fixed to the supporting elements 15A, 15B and protrudes upwards therefrom. The auxiliary supporting member 18 is configured to engage a mount 42 comprised in the assembly, as will be better described herein below with particular reference to the section views of FIGS. 4-7. For example, the auxiliary supporting member 18 may comprise two arms 18A, 18B provided with a certain elasticity in order to alternatively snap or disengage to/from the mount 42, respectively during insertion or removal of the assembly 11.

In FIG. 3 a portion of a dispensing machine 10 provided with supporting means that are elongated and may in particular have a linear extension in a direction parallel to a longitudinal direction X is shown. In this FIG. six fixtures 13 are shown retaining and supporting six assemblies 11.

According to the illustrated exemplary portion of a dispensing machine, a slider 20 (FIGS. 3 and 4) is provided, which is moveable on linear guides 21, 22 (FIG. 3), which define guide means of the slider 20.

The slider 20 may for example be attached both to an upper guide 21a, and to a lower guide 21b.

Optionally, the slider 20 may also be attached to a motorized guide 22, which extends parallel to the upper and lower guides 21a, 21b and is interposed between them. A drive motor 23 is associated with the motorized guide 22 and causes a movement of the slider 20 along the linear guides 21, 22.

Due to the linear guides 21, 22, the slider 20 can slide parallel to the longitudinal direction X.

In the depicted example, the dispensing machine 10 further comprises a digital scale 16, as a non-limiting example of a metering means suitable to meter a quantity of fluid product that has been delivered.

The scale 16 may be arranged on the slider 20 and comprise a support plane 17 on which a receptacle 80 can be disposed (FIG. 11), inside which the different fluid products are delivered to obtain the desired formulation.

According to the present invention the receptacle can for example be a can, cup or other container, open at the top, with a substantially cylindrical or truncated conical shape, and having a capacity suitable to contain the expected quantity of the desired formulation.

As shown in FIG. 3, the slider 20, and with it the scale 16 and the receptacle resting on the support plane 17, can move below all the assemblies 11 to receive the delivered fluid products necessary to obtain the desired color formulation by the one or more of the assemblies involved.

As better visible in FIG. 4 a first motor 46 and a second motor 55 are mounted on the slider 20. The first motor 46 is configured to drive pumping means 45 of the assembly 11, whilst the second motor 55 is configured to drive a rotatable diverting element 53 comprised in the valve arrangement of the assembly 11.

For example, the first motor 46 can rotate a command pin 47 around a vertical axis Z. The rotation of the command pin 47 actuates the pumping means 45, in a manner that will be disclosed in greater detail herein below.

The second motor 55 can rotate a shaft 59, which is connected to a drive shaft 56 to rotate the latter. The drive shaft is mechanically connected to the rotatable diverting element 53 and causes the controlled rotation of the latter. Both the shaft 59 and the drive shaft 56 rotate around a horizontal axis Y. In one embodiment, the rotation of the shafts 59, 56 is controlled by means of sensors (not shown) that read the amount of rotation of a pole wheel 60, which is mounted on the shaft 59. In this way, it is possible to control the rotation of the rotatable diverting element 53 in a very reliable and precise manner.

It should be noted that advantageously each assembly 11 is free of motor means. In fact, when the fluid product is delivered from a certain assembly 11, the slider 20 carrying the motor means 46, 55 is disposed in correspondence with the latter. In this way, the same motor 46 is operatively associated, time by time, with the pump assembly 45 comprised in the assembly 11 from which the fluid product is to be delivered. In fact, the motor 46 is mechanically connected with one of the pump assembly 45 at a time, for making this pump assembly 45 delivering the fluid product.

The dispensing machine according to the invention may optionally comprise an optical reader 57 defining optical detection means configured to detect an identification code that is univocally associated with each assembly 11. The optical reader 57 may optionally also be disposed on the slider 20, as visible in FIG. 4.

The optical reader 57 may for example be a bar-code reader known in the art.

The aforesaid identification code univocally associated to each assembly 11 may be configured as an identifying label of the fluid product contained in the container 12. For example, as visible in FIGS. 1 and 2, the assembly 11 according to the invention comprises a front wall 43, positioned in front of the container 12, and configured to receive said identifying label.

As shown in FIGS. 1 and 2, the assembly 11 may further comprise a handle 58, which allows the operator to easily grasp the assembly 11.

With particular reference to FIGS. 5-7 and 8A-8C, we will now describe the assembly 11 according to the invention, and its operation, in greater detail.

The assembly 11 comprises a housing 44 having a dispense opening 40 through which the fluid product may be delivered to an underneath receptacle. The housing 44 also comprises the aforesaid mount 42, inside which a threaded internal cavity 42A is defined for releasably receiving the container 12. To this end, the container 12 is provided with a neck 12A, externally threaded which allows the container 12 to be screwed inside the threaded internal cavity 42A.

Typically, the container 12 is disposed upside down, with the neck 12a facing down and the bottom upward.

As said above, the assembly 11 further comprises pumping means 45 of a type known in the art, which for this reason will not be described here in detail. In the exemplary embodiments shown in the annexed figures, the pumping means 45 is configured as a bellows pump with an alternating movement back and forth of the pumping element, as indicated by the bi-directional arrow F in FIG. 5.

According to the illustrated example described here, in the housing 44 a plurality of conduits 49, 50, 52 are present.

According to the invention, the assembly comprises a suction conduit 49 connected to an inlet of the pumping means 45 for withdrawing fluid product from the container 12, a delivery conduit 50 fluidly connecting an outlet of the pumping means 45 and the aforesaid rotatable diverting element 53, and a recirculation conduit 52 fluidly connecting the rotatable diverting element 53 to the container 12 for returning fluid product to the container 12. Preferably, the recirculation conduit 52 is arranged downstream of the diverting element 53, with reference to the fluid path flow.

According to the exemplary embodiments described here, the assembly comprises a plurality of valve elements that are disposed in suitable position of the housing 44.

Thus, check valves 51 are provided both in the suction conduit 49 and in the delivery conduit 50 to prevent undesired backflow of fluid product to the container 12 along these conduits. In this embodiment, the fluid product can thus travel along the suction conduit 49 from the container 12 to the pumping means 45 and along the delivery conduit 50 from the pumping means 45 to the diverting element 53.

Figure 6:
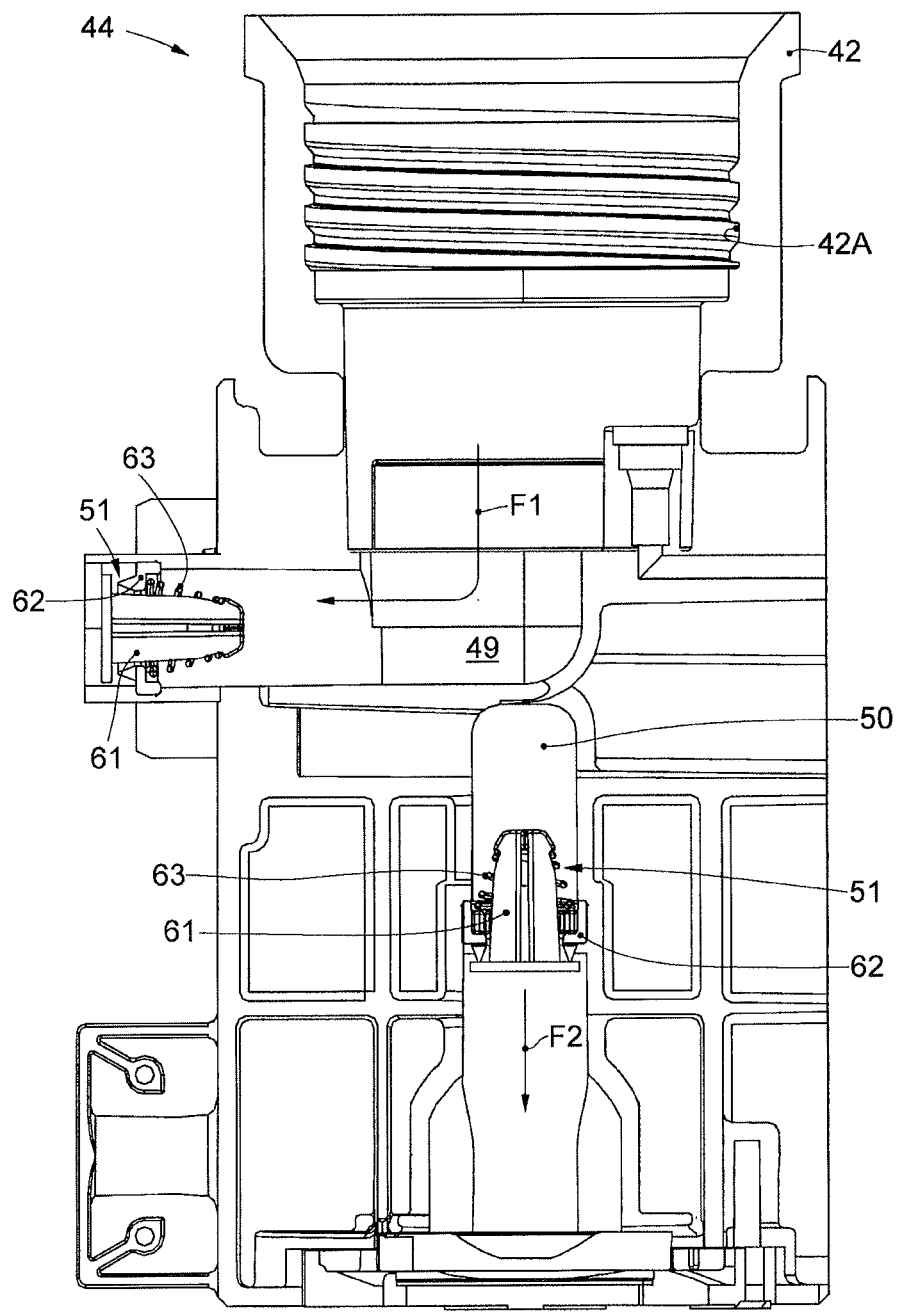
FIG. 6 is another enlarged detailed view of the section view of FIG. 5.

According to this embodiment, as better visible in FIG. 6, the check valves 51 comprise a blocking pin 61 that is movable along the longitudinal axis of the conduit in which the respective valve is mounted. The blocking pin 61 is normally kept pushed against its seat 62 by a spring 63, suitably dimensioned to exert a determined elastic force. When the flow of the fluid product reaches the respective check valve 51, it overcome the elastic force of the spring 63 so as move the blocking pin 61 away from its seat 62, so as to allow the fluid product to pass.

As set forth herein above, the assembly 11 according to the present invention comprises a rotatable diverting element 53, configured as one of the valve elements received in the housing 44.

In one embodiment, the diverting element 53 is rotatable around a rotation axis R, which is substantially parallel or corresponds to the horizontal axis Y.

In one embodiment, the diverting element 53 has a spherical or cylindrical shape.

The diverting element 53 comprises a first channel A and a second channel B that are fluidly connected to one another by a central hole 64.

In the embodiment shown in the annexed FIGS. 7 and 8A-8C, the channels A, B extend parallel to one another and depart tangentially from the central hole 64. It should be noted that they are arranged according to a configuration of symmetry with respect to the rotation axis R.

Preferably, the channels A, B extend in a direction that is perpendicular to the rotation axis R.

The channels A, B extend between the central hole 64 and respective ends 66, which terminate on a peripheral surface 65 of the rotatable diverting element 53. Due to the arrangement of the channels A, B said above, it should be noted that the ends 66 of the two channels A, B are disposed opposite one another by approximately 180°, such as 180°±5° or 180°±2°.

Figure 9:
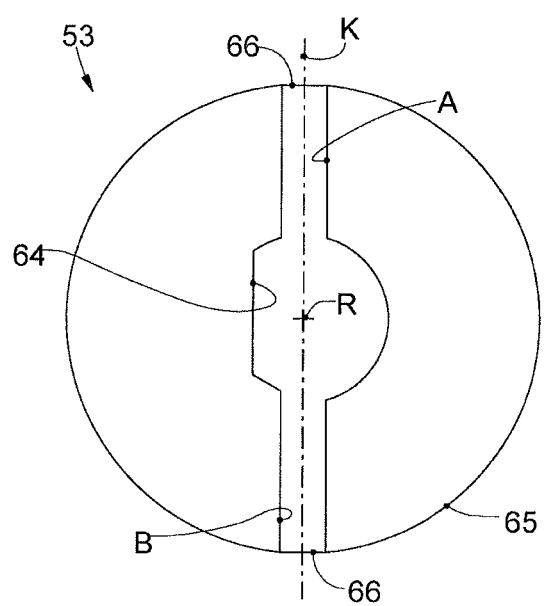
FIG. 9 shows an alternative variant of a rotatable diverting element (in cross-section as in FIG. 7) that may be used in the assemblies according to the invention.

According to an exemplary specific configuration of the diverting element 53, shown in FIG. 9, the channels A and B depart from opposite side of the central hole 64 so as to be exactly aligned to one another. In this variant, the channels A, B extend along the same axis of development K, being one the straight extension of the other.

Figure 10:
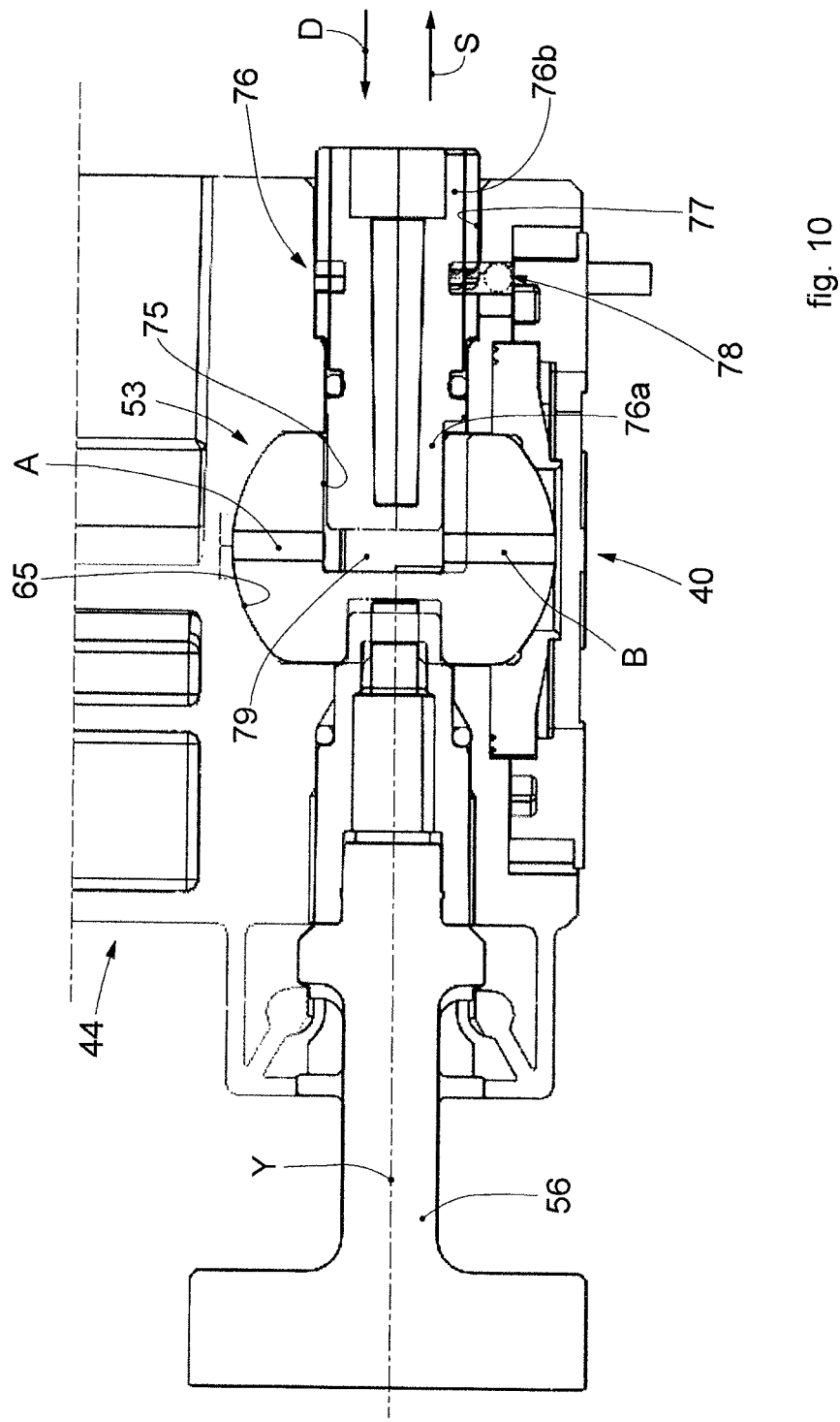
FIG. 10 shows a section view of an assembly according to the invention with a rotatable diverting element having a fluid-conditioning device associated thereto (in cross-section as in FIG. 5)

As shown in FIG. 10, the rotatable diverting element 53 may optionally comprise a socket 75 that is configured to house, at least partially, a fluid-conditioning device 76. The fluid-conditioning device 76 depicted in FIG. 10 comprises a proximal end 76a that is housed inside the socket 75 and in fluid communication with the channels A, B of the diverting element 53, and a distal end 76B that protrudes outside the diverting element 53. The distal end 76B is received inside a respective hole 77 that is made in the housing 44. The proximal end 76a is shaped so as to define a mechanical connection with the diverting element 53 so that the rotation of the latter around the rotation axis R (coinciding with the horizontal axis Y in FIG. 10) transmits the motion also the fluid-conditioning device 76. To this end, by way of example, a key can be associated to the proximal end 76a or, equivalently, at least on portion of the circumferential peripheral surface of the proximal end 76a is shaped to act as a key. A guide pin 78 is provided that engages the fluid-conditioning device 76 and it is configured to confer an axial movement (i.e. along the horizontal axis Y) to the fluid-conditioning device 76. In one possible embodiment, the guide pin 78 moves inside a shaped path (not shown in the figures) so as to define a system cam-follower to confer the fluid-conditioning device 76 the desired axial movement. In other words, the fluid-conditioning device 76 would tend to rotate together with the diverting element 53 due to the mechanical connection between them, but rotation of the fluid-conditioning device 76 is prevented by the mechanical constraint of the guide pin 78, which by moving inside the shaped path impart the fluid-conditioning device 76 a backward and forward linear motion, so as to convert the rotational motion into a translational one. The function of the fluid-conditioning device 76 will be disclosed in greater detail below during the disclosure of the assembly operation.

Figure 7:
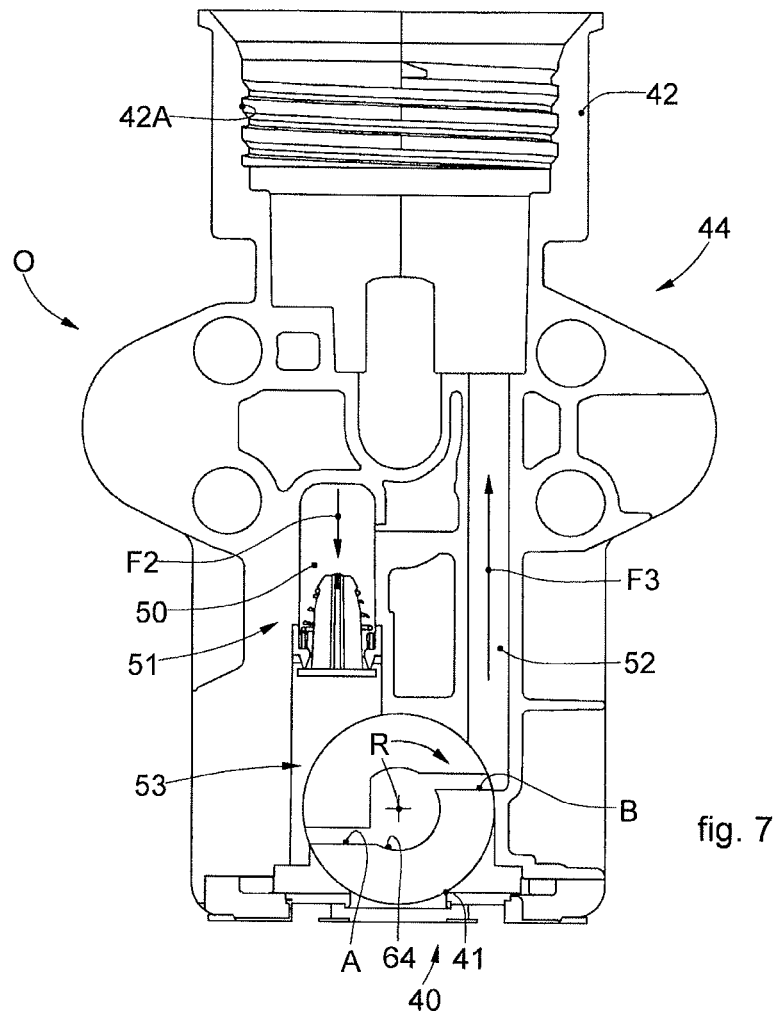
FIG. 7 is an enlarged detailed section view as the one of FIG. 6, taken along a second longitudinal section plane, perpendicular to the first longitudinal section plane.

It should be noted that in FIG. 10 the channels A and B are shown as in the configuration of FIG. 9, but it is evident that they can also assume either the equivalent configuration shown in FIG. 7.

In operation, the slider 20 is brought in a position in which it is operatively connected to the assembly 11 from which the dispensing should occur, for example in the manner explained above. Here, the first motor 46 makes the command pin 47 rotating around the vertical axis Z to rotate in turn the fins 48. Please note that the backward movement and the forward movement of the bellows pump are obtained by rotating the command pin 47 (and thus the fins 48) in opposite rotation direction, i.e. in clockwise and counter-clockwise direction.

The pumping means 45, actuated as said above, withdraws a certain amount of fluid from the container 12. The amount of fluid withdrawn per each stroke of the bellows is predetermined and is a function of the pump's size and dimension.

The fluid product leaving the container 12 enters the suction conduit 49 and travels along the latter as indicated by the arrow F1 (FIGS. 5 and 6). Then the fluid product reaches the check valve 51, mounted along the suction conduit 49, upstream the pumping means 45.

Upon reaching the pumping means 45, the fluid product changes its travel direction, entering the delivery conduit 50 (FIGS. 6 and 7), as indicated by the arrow F2, and trespasses the check valve 51 mounted in this conduit. After this, the fluid product reaches the diverting element 53, by which it can be alternatively diverted either to the recirculation conduit 52 or to the dispense opening 40, as will be explained in greater detail herein below.

Figure 8A:
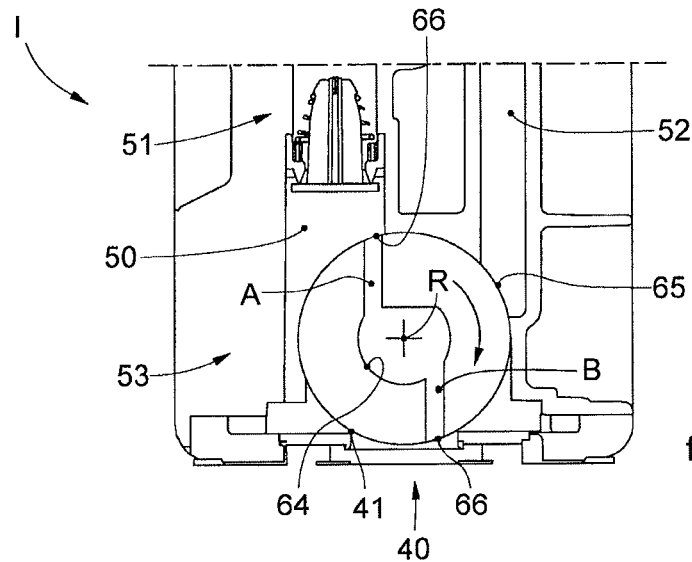
FIGS. 8A-8C show an enlarged detail of FIG. 7, showing an operating sequence thereof.
Figure 8B:
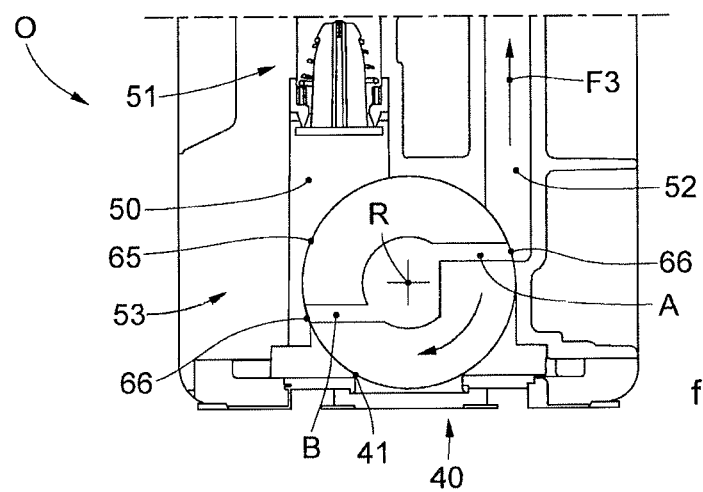

With reference to the configuration shown in FIGS. 7 and 8B, the diverting element 53 is placed in a recirculation position O in which the delivery conduit 50 fluidly connects with the recirculation conduit 52 so as to recirculate the fluid product to the container 12, as indicated by the arrow F3 in FIGS. 7 and 8B.

Figure 8C:
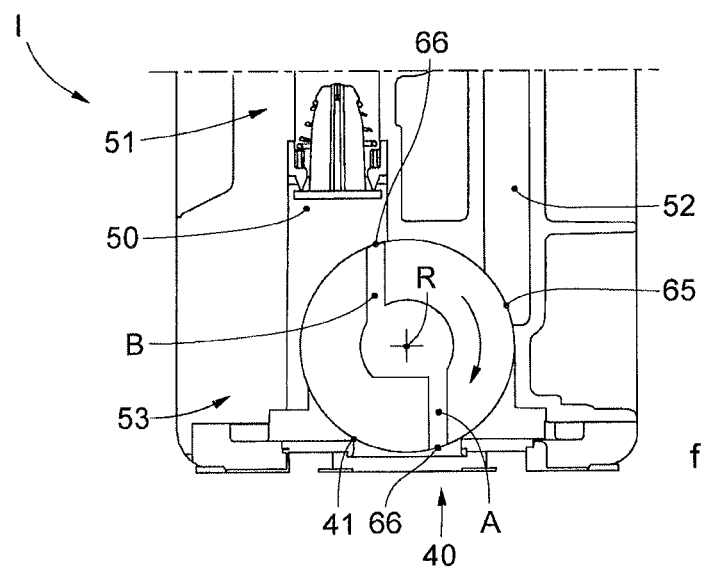

Alternatively, with reference to the configuration shown in FIGS. 8A and 8C, the diverting element 53 is placed in a delivery position I in which the delivery conduit 50 fluidly connects with the dispense opening 40 for dispensing the fluid product.

In the recirculation position O the open end 66 of one of the channels faces an open end of the delivery conduit 50, to be in fluid communication with the delivery conduit 50, and the open end 66 of the other channel faces an open end of the recirculation conduit 52, to be in fluid communication with the latter.

In the delivery position I, the open end 66 of one of the channels faces an open end of the delivery conduit 50, to be in fluid communication with the delivery conduit 50, and the open end 66 of the other channel faces the dispense opening 40.

In one embodiment, the rotatable diverting element 53 has two recirculation positions O and two delivery positions I per each complete rotation of the diverting element 53 around its rotation axis R. In this embodiment, the diverting element 53 is rotated by the same angle, for example of about 90° in the clockwise direction, to subsequently reach each of said positions.

The table below summarizes the sequence of the positions that the diverting element 53 attains during one complete rotation around the rotation axis R. It is evident that the operation of the rotatable diverting element 53 is cyclical and after the position shown in FIG. 8C, in which the element has rotated of about 270° from the beginning, the diverting element 53 comes back in the initial position of FIG. 7 where the rotation of the round angle 360° is completed.

Thus, in the condition indicated in the first and the third column (FIGS. 7 and 8B) the diverting element 53 is in the recirculation position O defined above, whilst in the condition indicated in the second and fourth columns (FIGS. 8A and 8C), the diverting element 53 is in the delivery position I.

The channel indicated in the row corresponding to the "fluid in" faces the delivery conduit 50, whilst the channel indicated in the rows "fluid out" faces alternatively the recirculation conduit 52 (third row of the table) or the dispense opening 40 (fourth row of the table).

| Rotation angle of the diverting element 53 | 0° (FIG. 7) | 90° (FIG. 8A) | 180° (FIG. 8B) | 270° (FIG. 8C) |
|---|---|---|---|---|
| Fluid in | Channel A | Channel A | Channel B | Channel B |
| Fluid out (to the container 12) | Channel B | — | Channel A | — |
| Fluid out (to the dispense opening 40) | — | Channel B | — | Channel A |

It should be noted that the channels A, B can indifferently lead the fluid product in or out of the diverting element 53. Thus, the fluid product can enter the diverting element 53 by the channel A and leave the same element by the channel B, or vice versa.

This is advantageous because it minimizes the movement of the diverting element 53 from one position to another and makes the diverting element 53 very easy to be controlled. This is also advantageous because the diverting element 53 is very simple and cheap.

In some embodiments of the invention, the diameter of the channels A, B, and therefore also of their open ends, are calibrated in function of the desired flow rate of the dispensed fluid product during the delivery step.

As shown in the annexed figures, the channels A, B may have the same dimensions and/or shape. The channels A, B might however also have dimensions and/or a shape different from one another. In a specific variant the channels A, B have substantially the same cross-section, i.e. the cross-sectional area is the same or differs by less than 5%.

As better visible in the enlargement of FIG. 5A, the assembly 11 may further comprise a strip off element 41, which is proximate to or in contact with the peripheral surface 65 of the diverting element 53. The strip off element 41 acts as a means for cleaning the peripheral surface 65 of the diverting element 53 by exerting a mechanical action due to which it is possible to scrape the peripheral surface 65 of the diverting element 53 during the rotation of the latter around the rotation axis R. This is advantageous because dirt or possible dried fluid product residues can be continuously removed from the peripheral surface 65 of the diverting element 53 by the strip off element 41, so that said external surface is maintained cleaned. In one possible embodiment, the strip off element 41 is shaped as a ring and received in a cavity 67 made in the bottom of the assembly 11. A supporting member 68 elastically locks the strip off element 41 in the cavity 67 due to the presence, below the supporting member 68, of a spring member 69. Preferably, the spring member 69 is a disc spring continuously pushing upwards, due to its elastic force, the supporting member 68 and—through the latter—the strip off element 41 so as to constantly keep the strip off element 41 proximate the peripheral surface 65 of the diverting element 53. In possible implementations, the assembly 11 comprises a cover element 73 closing the cavity 67 and protecting the diverting element 53, the strip off element 41 and the members 68, 69, which otherwise would all be exposed externally on the bottom side of the assembly 11. By way of example, the cover element 73 can be fixed to the assembly 11 by fastening means, as screws. The cover element 73 is provided with a hole 74 configured to let the fluid product passing therethrough during dispensing. During dispensing the hole 74 is thus substantially aligned with the channel A, B that is leading the fluid product to the dispense opening 40.

Referring to the exemplary embodiment of FIG. 10, in which the fluid-conditioning device 76 is provided, during the 90° rotation of the diverting element 53, the fluid-conditioning device 76 initially performs a backward stroke, moving in the direction indicated by the arrow S in FIG. 10, and subsequently performs a forward stroke, moving in the opposite direction indicated by the arrow D in FIG. 10. It should be noted that even in the condition in which the fluid-conditioning device 76 is entirely received inside the socket 75, a chamber 79 is defined in the portion of the socket 75 closest to the central hole 64, in order to ensure the fluid communication between the channels A, B. During the backward stroke S of the fluid-conditioning device 76, the chamber 79 increases its volume so as to accommodate a certain quantity of fluid that is sucked from the channels A and B During the subsequent forward stroke D the fluid-conditioning device 76 delivers fluid present in the chamber 79 alternatively to the delivery conduit 50 or to the recirculation conduit 52, or both. In particular, the fluid present in the chamber 79 is delivered to the conduit/s that are in fluid communication with the chamber 79 through the channel/s A and/or B. It should be noted that while the fluid is being dispensed through the dispense opening 40, the fluid-conditioning device 76 is inactive since the diverting element 53 is steady. In fact, the fluid-conditioning device 76 operates only during the transient phases, i.e. during the rotation of the diverting element 53 during which the latter reaches one at a time, the four different positions shown in FIGS. 7 and 8A-8C. This embodiment is advantageous since the fluid-conditioning device 76 sucks the last drips of the fluid that remain in the diverting element 53 after the dispensing stage is finished, and then delivers these drips of fluid back in one of the channels 50, 52 made in the housing 44.

In this manner, this embodiment of the assembly 11 allows to obtain a still more precise dispensing preventing any extra-drips from dropping after dispensing is finished. Advantageously, this allows to maintain cleaner the assembly 11 itself and to dispense with great precision and reliability the expected metered quantity of fluid products.

The dispensing machine 10 may further comprise a controller, not shown in the figures and of a type known in the art.

The controller may be operationally linked to the actuation means, embodied for example as the drive motor 23, and/or to the metering means, embodied for example as the digital scale 16, and/or to the delivery means, embodied for example as the pump assembly 45. In use, the controller is configured to command the actuation means to move the receptacle via the slider 20 sequentially to the dispense positions below one or more of the assemblies 11 to receive a quantity of fluid product dispensed from the respective assembly 11 as metered by the digital scale 16 to produce a formulation according to a user-defined recipe. Thus a complex formulation can be prepared from a number of different fluid ingredients according to a user-defined recipe in a convenient and efficient manner. The present invention is particularly useful for preparing color formulations. It can for example be used to provide user-defined paint formulations, particularly for refinishing or repair purposes, for example in a body shop for painting a vehicle body.

Figure 11:
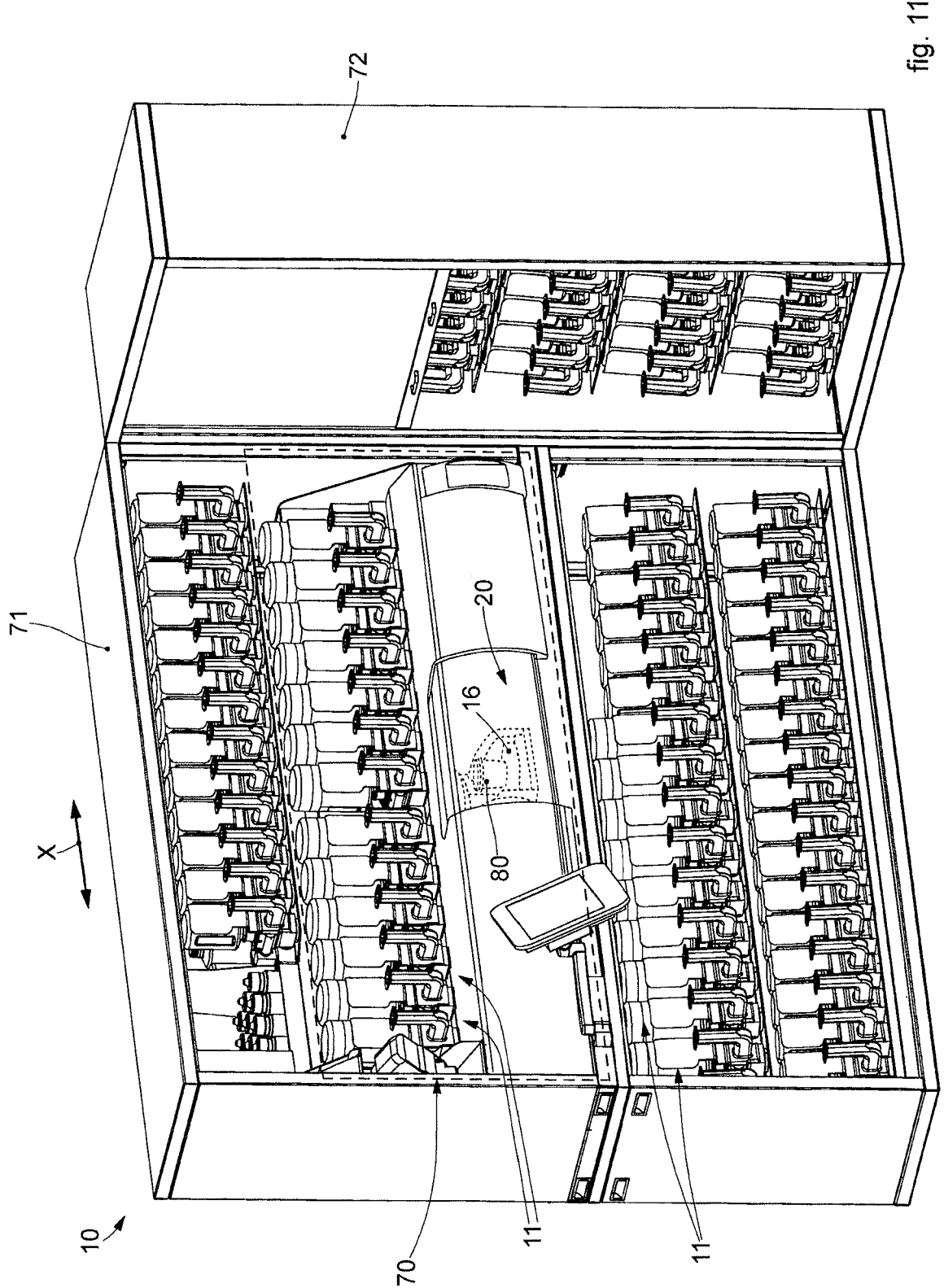
FIG. 11 is a schematic perspective view of a dispensing machine according to the invention, comprising a plurality of dispensing assemblies of the invention.

An example of dispensing machine for dispensing fluid products comprising at least one assembly 11 according to the present invention is shown in FIG. 11, where the dispensing machine is indicated overall with the reference number 10.

The dispensing machine 10 comprises a dispensing zone 70 in which the aforesaid support means are disposed to support a plurality of assemblies 11, as disclosed above and shown in FIGS. 1 and 2. In this exemplary machine, the slider 20 carrying the scale 16 and the receptacle slides in the dispensing zone 70, parallel to the longitudinal direction X, to delivery positions that are substantially vertically below the assemblies 11 disposed in said support means. In the dispensing machine 10 shown in FIG. 11, the support means may be configured to support, by way of example, up to thirteen assemblies 11 disposed adjacent along a row that has been highlighted by a dashed rectangle. The dispensing machine 10 comprises a main cabinet 71 and a secondary cabinet 72, disposed for example on the right side of the main cabinet 71, angled to the latter. Both in the main cabinet 71 and the secondary cabinet 72, some storage zones are provided, configured to store a plurality of assemblies 11, among which those to be disposed on the support means of the dispensing zone 70 can be selected. In the storage zones of the main cabinet 71 assemblies 11 can be disposed adjacent to each other, so as to define a sort of support shelves, which extend parallel to the longitudinal direction X, above and below the row of assemblies 11 disposed in the dispensing zone 70. Also the storage zones of the secondary cabinet 72 can be configured as a plurality of support shelves, each supporting, by way of example, five assemblies 11. Owing to the storage zones, the dispensing machine 10 may store a large number of assemblies 11, for example between fifty and eighty assemblies 11.

As said above, the present invention is also directed towards a method for dispensing fluid products.

This method comprises in accordance with a preferred mode of operation of the afore-described dispensing machine:
  (a) providing a housing 44 having a dispense opening 40 and comprising a mount 42 for a container 12 that contains the fluid product, and pumping means 45;
  (b) providing a valve arrangement comprising a diverting element 53 rotatable around a rotation axis R provided with a first channel A and a second channel B, which are in fluid communication with one another and each have an open end 66 arranged radially with respect to the rotation axis R on a peripheral surface 65 of the rotatable diverting element 53;
  (c) actuating said pumping means 45 to extract the fluid product from the container through a suction conduit 49 connected to an inlet of the pumping means 45 for withdrawing fluid product from said container 12 installed on the mount 42, and to delivery the fluid product to a delivery conduit 50 fluidly connecting an outlet of the pumping means 45 and said rotatable diverting element 53;
  (d) driving the rotatable diverting element 53 to alternatively bring it in one recirculation position O, in which the open end 66 of one the channels is aligned with an open end of the delivery conduit 50 and the open end 66 of the other channel is aligned with an open end of a recirculation conduit 52 fluidly connecting the diverting element 53 to the container 12 for returning fluid product to the container 12, or in one delivery position I, in which the open end 66 of one of channels is aligned with an open end of the delivery conduit 50 and the open end 66 of the other channel is aligned with the dispense opening 40 for dispensing fluid product.

The method can comprise bringing the rotatable diverting element 53 to a recirculation position O as defined above and operate the pumping means to withdraw fluid product via the suction conduit 49 from the container 12 and recirculate it via the recirculation conduit to the container prior to dispensing fluid product. Such recirculation prior to dispensing can for example be performed when a container has been freshly installed or after non-use for some time, for example when no fluid product has been dispensed therefrom over a predetermined period of time. The fluid product may thus be recirculated for a given amount of time, for example 1 minute or less, to efficiently homogenize the fluid product and purge the channels of the rotatable diverting element 53 prior to its use. No waste material is produced by such operation. Information on the status and history of the assemblies and containers with fluid product mounted thereto may for example be stored and acted on accordingly when a particular assembly is operatively connected with driving means of the dispensing machine and identified by detection means such as a bar code reader mounted to the movable slider as described above. It is also possible according to the present invention to perform a recirculation without subsequent dispense of fluid product, e.g. at a predetermined interval, to avoid or counteract phase separation, agglomeration, sedimentation or other kind of ageing or degradation of the fluid product upon storage.

At the end of the delivery cycle, when the amount to be dispensed has been delivered to the receptacle, there may still be fluid product in the diverting element 53 such there is a risk of overdosing due to droplets of this material releasing from the diverting element 53, for example by mechanical agitation (upon rotation). This may be prevented by the action of the fluid-conditioning device 76, which upon changeover to the recirculation position temporarily retracts (through suction) the residual fluid product in the diverting element 53 and then expels it to the recirculation and/or delivery conduit as discussed above. Accordingly, in the method of the invention during said driving of said diverting element 53 around said rotation axis a fluid-conditioning device 76 associated to said rotatable diverting element 53 may perform a backward and forward stroke in order respectively to suck drips of fluid product that are present in said first and second channels A, B and to deliver such drips of fluid product towards said recirculation conduit 52 and/or said delivery conduit 50.

It is clear that modifications and/or additions of parts to the assembly and/or machine as described heretofore can be made, without departing from the field and scope of the present invention.

The present invention has been described with reference to some specific examples, a person of skill in the art shall certainly be able to achieve many other equivalent forms of the assembly or method for dispensing fluid products, having the characteristics as set forth in the claims and hence all coming within the field of protection defined thereby.

We claim:

1. An assembly for dispensing fluid products, comprising:
   a housing having a dispense opening and comprising a mount for a container that contains the fluid product,
   pumping means,
   a valve arrangement comprising a diverting element rotatable around a rotation axis provided with a first channel and a second channel, which are in fluid communication with one another and each have an open end arranged radially with respect to the rotation axis on a peripheral surface of the rotatable diverting element,
   a suction conduit connected to an inlet of the pumping means for withdrawing fluid product from said container installed on the mount,
   a delivery conduit fluidly connecting an outlet of the pumping means and said rotatable diverting element,
   a recirculation conduit fluidly connecting the diverting element to the container for returning fluid product to it,
   wherein the rotatable diverting element has at least one recirculation position in which the open end of one of the channels faces the open end of the delivery conduit to be in fluid communication with the delivery conduit and the open end of the other channel faces the recirculation conduit to be in fluid communication with the recirculation conduit so as to recirculate the fluid product to the container and at least one delivery position, in which the open end of one of the channels faces an open end of the delivery conduit to be in fluid communication with the delivery conduit, and the open end of the other channel faces the dispense opening for dispensing the fluid product.

2. The assembly as in claim 1, wherein said first channel and said second channel have a symmetric configuration one to the other with respect to the rotation axis.

3. The assembly as in claim 1, wherein said first channel and said second channel are in fluid communication through a central hole; said first channel and said second channel extend parallel to one another and depart in a tangential manner from said central hole.

4. The assembly as in claim 1, wherein the open ends of said channels are on the peripheral surface of said rotating diverting element in respective positions such that the open ends are arranged opposite one another by approximately 180°.

5. The assembly as in claim 1, wherein the rotatable diverting element has two recirculation positions and two delivery positions per each complete rotation of the diverting element around its rotation axis, wherein the diverting element to reach each of said position is rotated by the same angle, for example of about 90°.

6. The assembly as in claim 5, wherein in one of said recirculation positions the first channel communicates with the delivery conduit and the second channel communicates with the recirculation conduit, whilst in the other recirculation position the second channel communicates with the delivery conduit and the first channel communicates with the recirculation conduit; and wherein in one of said delivery positions the first channel communicates with the delivery conduit and the second channel communicates with the dispensing opening, whilst in the other delivery position the second channel communicates with the delivery conduit and the first channel communicates with the dispense opening.

7. The assembly as in claim 1, wherein said pumping means and said rotatable diverting element are independently driven by respective motors.

8. The assembly as in claim 7, wherein said pumping means and said rotatable diverting element comprise coupling means configured to be engaged by a driving element connected to said respective motor; said driving element and said respective motor preferably being mounted on a movable slider that can selectively be engaged with the assembly for dispensing fluid products at least upon dispensing by said assembly.

9. The assembly as in claim 1, wherein said pumping means comprises a pump selected from a bellows pump, a piston pump, a gear pump or a combination thereof.

10. The assembly as in claim 1, wherein said valve arrangement further comprises a check valve disposed along the suction conduit and/or a check valve disposed along the delivery conduit.

11. The assembly as in claim 1, further comprising a strip off element, which is proximate to or in contact with the peripheral surface of said diverting element for cleaning this surface, wherein preferably the strip off element is shaped as a ring and is received in a cavity made in a bottom of the assembly.

12. The assembly as in claim 11, and comprising a supporting member elastically locking the strip off element in said cavity due to the presence, in particular below the supporting member, of a spring member, which is preferably a disc spring configured for pushing upwards the supporting member and the strip off element so as to constantly keep the strip off element proximate the peripheral surface of the diverting element.

13. The assembly as in claim 1, comprising a coupling portion configured to allow for removably mounting the assembly to a mating fixture comprised by support means of a dispensing machine.

14. The assembly as in claim 1, comprising an identity code, as for example a bi-dimensional or a tri-dimensional bar code, or an RFID tag, that is univocally associated to the assembly and that is configured to be read by detection means, such as an optical bar code reader, mounted on a movable slider comprised in a dispensing machine to which the assembly may be associated.

15. The assembly as in claim 1, comprising an ergonomic handle projecting from said housing from a front side opposite said pumping means and intended to be grasped by the operator handling the assembly.

16. The assembly as in claim 1, comprising a fluid-conditioning device associated to said rotatable diverting element and configured to perform a backward and forward stroke during the rotation of said diverting element around said rotation axis in order respectively to suck drips of fluid product that are present in said first and second channels and to deliver such drips of fluid product towards said recirculation conduit and/or said delivery conduit.

17. The assembly as in claim 16, wherein said fluid-conditioning device is connected to said rotatable diverting element by means of a mechanical connection so that the motion of said fluid-conditioning device is driven by the rotation of said rotatable diverting element, and wherein a guide system is provided that allows the rotation of said rotatable diverting element to be transformed into a linear translational motion of said fluid-conditioning device so that the latter can perform said backward and forward stroke.

18. A dispensing machine for dispensing fluid products comprising at least one assembly according to claim 1.

19. The dispensing machine according to claim 18 comprising a plurality of assemblies according to claim 1 mounted along linear support means.

20. The dispensing machine according to claim 18, further comprising a movable slider with at least one motor mounted thereon for driving the pumping means and/or the rotatable diverting element to control the dispense and/or recirculation of the respective fluid products when moved to a position in which it is in operative connection to an assembly, e.g. along a rail that extends parallel to the linear support means.

21. The dispensing machine according to claim 20, further comprising detection means, such as an optical bar code reader, for reading an identity code provided on the at least one assembly, wherein the detection means may preferably be mounted on the movable slider.

22. A method for dispensing fluid products, comprising:
(a) providing a housing having a dispense opening and comprising a mount for a container that contains the fluid product, and pumping means;
(b) providing a valve arrangement comprising a diverting element rotatable around a rotation axis provided with a first channel and a second channel, which are in fluid communication with one another and each have an open end arranged radially with respect to the rotation axis on a peripheral surface of the rotatable diverting element;
(c) actuating said pumping means to extract the fluid product from the container through a suction conduit connected to an inlet of the pumping means for withdrawing fluid product from said container installed on the mount, and to deliver the fluid product to a delivery conduit fluidly connecting an outlet of the pumping means and said rotatable diverting element;
(d) driving the rotatable diverting element to alternatively bring the diverting element in a recirculation position, in which the open end of one of the channels faces an open end of the delivery conduit to be in fluid communication with the delivery conduit and the open end of the other channel faces an open end of a recirculation conduit fluidly connecting the diverting element to the container for returning fluid product to the container, or in a delivery position, in which the open end of one of the channels faces an open end of the delivery conduit to be in fluid communication with the delivery conduit and the open end of the other channel faces the dispense opening for dispensing fluid product.

23. The method as in claim 22, wherein said driving the rotatable diverting element provides to bring the latter in two recirculation positions and two delivery positions per each complete rotation of the diverting element around the rotation axis, wherein said driving provides to rotate the diverting element by the same angle, for example of about 90°, to reach each of said positions, and wherein in one of said recirculation position the first channel communicates with the delivery conduit and the second channel communicates with the recirculation conduit, whilst in the other recirculation position the second channel communicates with the delivery conduit and the first channel communicates with the recirculation conduit; and wherein in one of said delivery position the first channel communicates with the delivery conduit and the second channel communicates with the dispensing opening, whilst in the other delivery position (I) the second channel communicates with the delivery conduit and the first channel communicates with the dispense opening.

24. The method as in claim 22, wherein during said driving of said diverting element around said rotation axis a fluid-conditioning device associated to said rotatable diverting element performs a backward and forward stroke in order respectively to suck drips of fluid product that are present in said first and second channels and to deliver such drips of fluid product towards said recirculation conduit and/or said delivery conduit.

\* \* \* \* \*